United States Patent
Chu et al.

(10) Patent No.: US 10,341,188 B2
(45) Date of Patent: Jul. 2, 2019

(54) NETWORK VIRTUALIZATION FOR NETWORK INFRASTRUCTURE

(71) Applicant: Huawei Technologies Co., Ltd., Shenzhen (CN)

(72) Inventors: Xingjun Chu, Ottawa (CA); Guoli Yin, Ottawa (CA); Yapeng Wu, Nepan (CA); Tao Wan, Ottawa (CA); Peter Ashwood-Smith, Gatineau (CA); Yinfeng Henry Yu, Ottawa (CA); Khaldoon Al-Zoubi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 556 days.

(21) Appl. No.: 14/606,329

(22) Filed: Jan. 27, 2015

(65) Prior Publication Data

US 2016/0218918 A1   Jul. 28, 2016

(51) Int. Cl.
| | |
|---|---|
| *G06F 15/177* | (2006.01) |
| *G06F 15/16* | (2006.01) |
| *H04L 12/26* | (2006.01) |
| *H04L 12/28* | (2006.01) |
| *H04L 12/66* | (2006.01) |
| *H04L 12/24* | (2006.01) |

(52) U.S. Cl.
CPC .......... *H04L 41/12* (2013.01); *H04L 41/5054* (2013.01)

(58) Field of Classification Search
CPC ............. H04L 41/0856; H04L 41/0896; H04L 41/5003; H04L 41/5054; H04L 41/5067; H04L 29/06; H04L 29/06027; H04L 29/2697; H04L 29/5695; H04L 12/1439; H04L 12/2854; H04L 65/103; H04L 65/104; H04L 65/4007
See application file for complete search history.

(56) References Cited

U.S. PATENT DOCUMENTS

| | | | | |
|---|---|---|---|---|
| 2009/0327471 | A1* | 12/2009 | Astete | H05K 999/99 709/223 |
| 2012/0084406 | A1 | 4/2012 | Kumbalimutt | |
| 2013/0014101 | A1 | 1/2013 | Ballani et al. | |
| 2013/0155845 | A1* | 6/2013 | Patel | H04L 45/04 370/225 |
| 2013/0227097 | A1* | 8/2013 | Yasuda | H04L 41/0813 709/222 |

(Continued)

FOREIGN PATENT DOCUMENTS

| | | |
|---|---|---|
| CN | 102651775 A | 8/2012 |
| CN | 103577457 | 2/2014 |

(Continued)

OTHER PUBLICATIONS

International Search Report of corresponding International Application No. PCT/CN2016/070671 dated Apr. 12, 2016.

(Continued)

*Primary Examiner* — Farzana B Huq

(57) ABSTRACT

A service description may be used in network virtualization in order to specify requirements of an application. In order to provide network virtualization for generic networking components, including legacy networking components, the service description is mapped to a logical network implementation and then subsequently mapped to a physical implementation.

22 Claims, 11 Drawing Sheets

(56) References Cited

U.S. PATENT DOCUMENTS

| | | | |
|---|---|---|---|
| 2013/0332982 A1* | 12/2013 | Rao | H04L 63/08 726/1 |
| 2014/0169215 A1* | 6/2014 | Rajendran | H04L 41/0806 370/254 |
| 2014/0208317 A1* | 7/2014 | Nakagawa | G06F 9/45533 718/1 |
| 2015/0082301 A1* | 3/2015 | Garg | H04L 41/12 718/1 |
| 2015/0139238 A1* | 5/2015 | Pourzandi | H04L 45/42 370/392 |
| 2015/0271303 A1* | 9/2015 | Neginhal | H04L 69/22 370/392 |
| 2015/0363221 A1* | 12/2015 | Terayama | H04L 12/4641 718/1 |
| 2016/0080502 A1* | 3/2016 | Yadav | H04L 41/12 709/227 |
| 2016/0094514 A1* | 3/2016 | Hsu | H04L 61/2503 370/392 |
| 2016/0127272 A1 | 5/2016 | Wang et al. | |
| 2017/0093688 A1* | 3/2017 | Tarricone | H04L 45/126 |

FOREIGN PATENT DOCUMENTS

| | | |
|---|---|---|
| CN | 103875210 | 6/2014 |
| CN | 104283756 A | 1/2015 |
| CN | 104468212 | 3/2015 |

OTHER PUBLICATIONS

English Abstract of US publication No. US2014040294 corresponding to cited Chinese Reference 103577457.
Translated Abstract of cited Chinese Reference 104468212.
English Abstract of US publication No. US2013097304 corresponding to cited Chinese Reference 103875210.
Cisco and/or its affiliates; Cisco Application Centric Infrastructure and Microsoft SCVMM and Azure Pack; 2014.
XP011493792 Mohammad Banikaremi et al.,"Meridian: An SDN Platform for Cloud Network Services",IEEE Communications Magazine .dated Feb. 1, 2013,total 8 pages.
Supplementary European Search Report on Application EP 16 74 2652 dated Jan. 17, 2018.

* cited by examiner

NETWORK VIRTUALIZATION FOR NETWORK INFRASTRUCTURE

TECHNICAL FIELD

The current application relates to network management techniques and in particular to the configuration of logical networks.

BACKGROUND

Data centers provide physical network infrastructure to multiple customers or tenants. Due to the sharing of the physical infrastructure of the data center among the multiple tenants, resource as well as service isolation between tenants is a requirement for data centers. The required isolation may be achieved using network virtualization that configures the physical infrastructure to provide separate isolated virtual networks.

Network virtualization may be achieved using various techniques and technologies such as Openflow, Overlay or other proprietary technologies such as CISCO ACI. However, these techniques depend strongly on underlying technology support and may rely on the use of specialized hardware. Accordingly, in order to support network virtualization, networking equipment may need to be upgraded, which may increase both operating expenses as well as capital expenses.

SUMMARY

In accordance with the present disclosure there is provided a method for network configuration in a multi-tenant network environment comprising receiving a service profile defining network application requirements for a tenant of the network environment, mapping the received service profile to a logical network implementation associating a plurality of logical routers, logical switches and logical appliances, mapping the logical network implementation to a physical network implementation on available network hardware in the network environment, generating component configuration information to configure the available network hardware to provide the physical network implementation of the service profile defining the network application requirements, and sending the generated component configuration information to the available network hardware for implementing the physical network implementation.

In accordance with the present disclosure there is further provided a computing device providing network configuration in a multi-tenant network environment comprising: a network interface for communicating with computing devices in the multi-tenant network environment, a memory for storing instructions, and a processor for executing the instructions. When executed by the processor, the instructions cause the processor to configure the computing device to: receive a service profile defining network application requirements for a tenant of the network environment, map the received service profile to a logical network implementation associating a plurality of logical routers, logical switches and logical appliances, map the logical network implementation to a physical network implementation on available network hardware in the network environment, generate component configuration information to configure the available network hardware to provide the physical network implementation of the service profile defining the network application requirements, and send the generated component configuration information to the available network hardware for implementing the physical network implementation.

BRIEF DESCRIPTION OF THE DRAWINGS

Embodiments are described herein with reference to the appended drawings, in which.

DETAILED DESCRIPTION

Increasingly, computer services or offerings are being virtualized. Through virtualization, a single physical computing device, such as a single physical server may used to provide a number of virtual servers that share the physical resources. Through virtualization, hardware resources may be more efficiently used. In addition to virtualization of computer devices such as servers, the virtualization may also be applied to networking components such as switches, using virtual local area networks (VLANs) or virtual extensible local area networks (VXLANs), as well as routers using virtual routing and forwarding (VRF). Allowing the virtualization of networking components may be advantageous from a point of view of maximizing the use of existing hardware; however, it may introduce an additional layer of configuration and management requirements in order to configure the available hardware to provide the desired virtual network components.

As described further below, network virtualization may benefit from the ability to map a group based policy (GBP) model description of a tenant's networking requirements to an intermediary logical network layer. The logical network layer provides a network representation of a logical network and may be directly mapped to the physical network infrastructure available, even when the available network infrastructure does not support virtualization techniques such as Openflow, Overlay or other proprietary technologies such as CISCO ACI. The ability to provide network virtualization techniques that allow a GBP model description to be mapped through a logical network layer to a physical implementation may simply the administration of virtualized networks, without requiring potentially large investments in new network hardware that support specific network virtualization techniques such as Openflow, Overlay or ACI.

Figure 1:
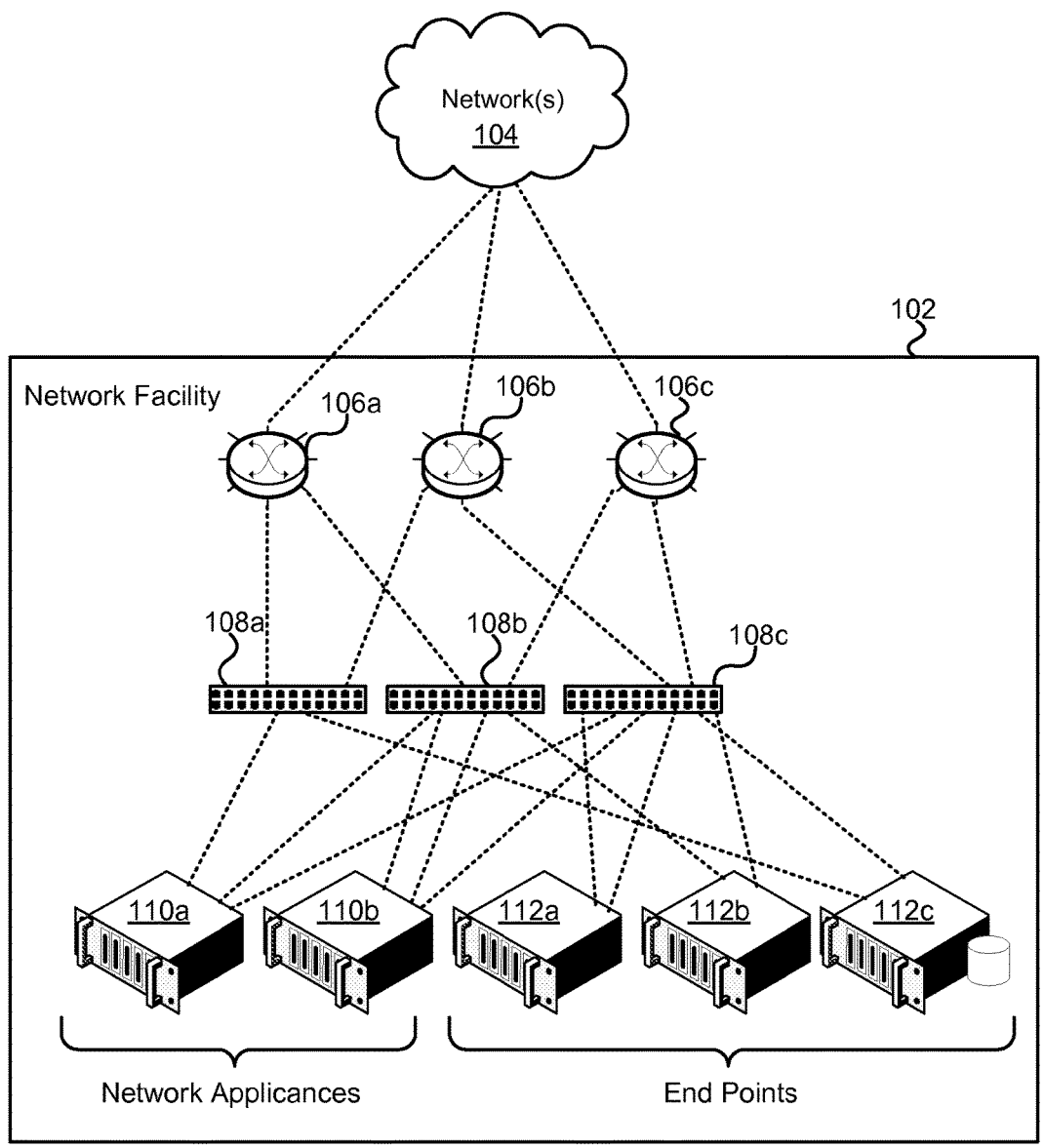
FIG. 1 depicts physical network components in a networking environment.

FIG. 1 depicts physical network components in a networking environment. The networking environment 100 may include a multi-tenant networking facility 102 that includes a plurality of interconnected physical networking components. The network facility 102 may be connected to one or more further networks 104. The networking facility 102 may include data centers, internet service provider (ISP) networks, corporate networks, or any other networking facility in which a plurality of physical networking components are collectively managed in order to provide separated networking functionality to a plurality of entities, referred to as tenants. The term tenant is not intended to imply that individual tenants are unrelated, or different, entities, but rather that an individual tenant's networking requirements are separate from other tenants' networking requirements. Regardless of the tenants, multi-tenancy networking facilities provide resource as well as service isolation between tenants, which may be achieved using network virtualization. As described further below, inserting a logical network layer between a service description, which allows for simple resource specifications from for example a tenant, and an abstracted/physical hardware layer allows for possibly simplified management of network virtualization, even using legacy networking components.

The networking facility 102 includes a plurality of networking components, whose functionality can be virtualized in order to service multiple tenants' networking requirements without exposing resources, data, services, etc. between the tenants' virtualized networks. The plurality of networking components may include, for example a plurality of physical routers 106a, 106b, 106c (referred to collectively as physical routers 106). The physical routers 106 include virtual routing forwarding (VRF) functionality that allows a single physical router to utilize multiple routing tables at the same time, which allows a single physical router to act as a plurality of individual, and separate, routers by provisioning the VRF router with appropriate configuration information.

The networking facility 102 may further comprise a number of physical networking switches 108a, 108b, 108c (referred to collectively as physical networking switches 108). The physical networking switches 108 provide switching between physically connected devices. The connections provided by the physical networking switches 108 may be configured. Further the switches may be configured to provide virtual local area networks (VLANs) or virtual extensible LANs (VXLANs), which allow the physical network switches 108 to provide multiple distinct, and isolated, broadcast domains. The VLANs and VXLANs allows a single virtual network to be spread across multiple different physical network switches 108 while remaining separated from other VLAN/VXLAN traffic.

The networking facility 102 may further comprise a number of physical networking appliances 110a, 110b (referred to collectively as physical networking appliances 110) and end points 112a, 112b, 112c (referred to collectively as end points 112) connected to one or more of the physical networking switches 108. Each of the physical networking appliances 110 and end points 112 may be provided by a specialized computing device or by a physical server. Generally, the network appliances 110 may include specialized computing devices as well as physical servers for providing commonly used networking functionality such as firewall functionality, load balancing functionality, network address translation (NAT) functionality, intrusion detection systems (IDS) functionality, as well as intrusion prevention system (IPS) functionality. The end points 112 may typically be considered as providing the functionality required by the tenants' applications. For example, the end points may include a plurality of physical servers that can be configured to provide a plurality of virtual servers, each of which a client can provision based on their particular requirements, such as providing web servers, application servers, database servers etc. The functionality of the networking appliances as well as the end points may be virtualized using a hypervisor or virtual machine monitor.

Figure 2:
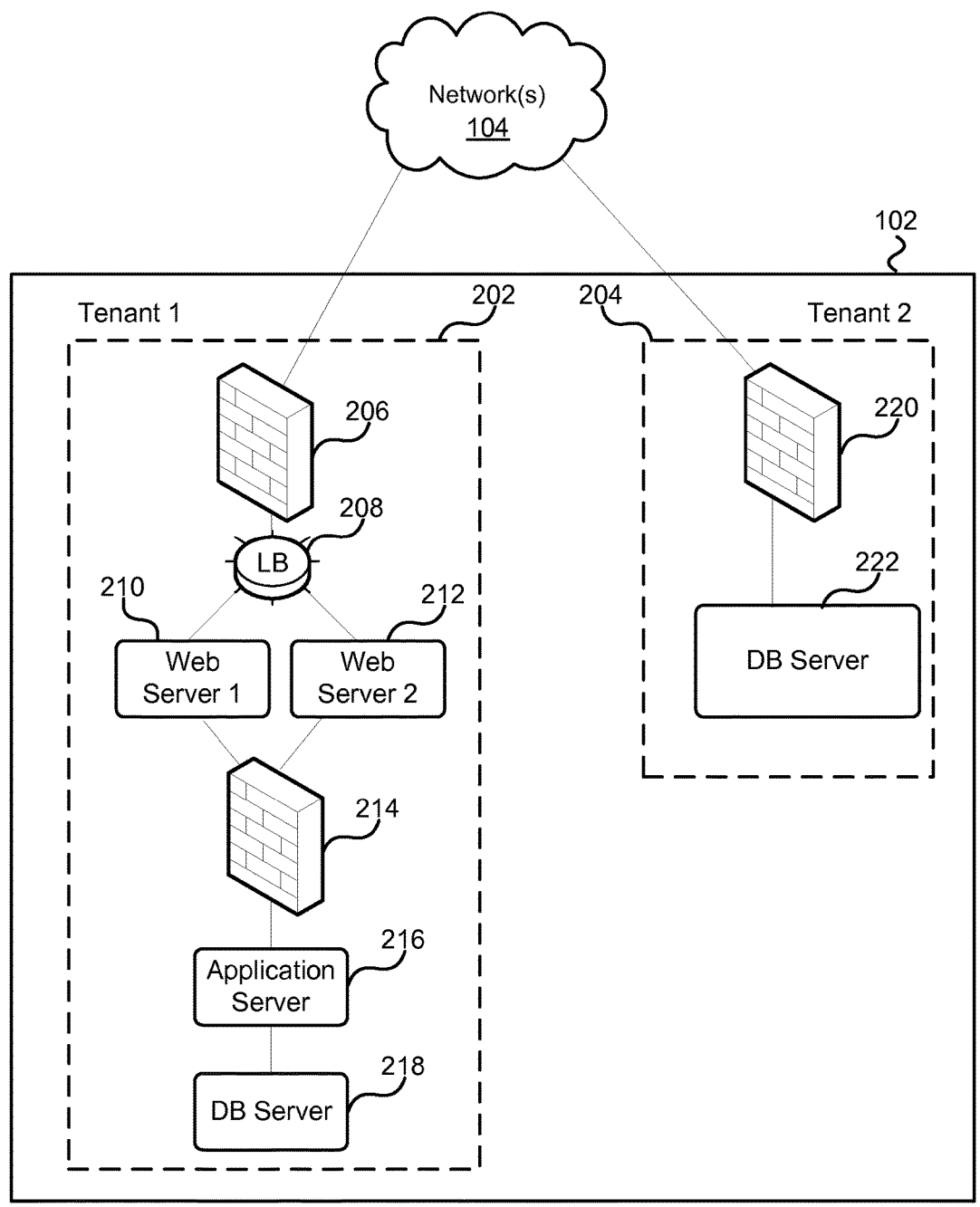
FIG. 2 depicts a view of a plurality of virtual networks that may be implemented using the physical network components.

FIG. 2 depicts a view of a plurality of virtual networks that may be implemented using the physical network components. Two virtual networks 202, 204 of respective tenants are depicted in FIG. 2. The two virtual networks 202, 204 may be implemented on the physical hardware components of the networking facility 102 described above with reference to FIG. 1. Although the two virtual networks 202, 204 are implemented on the same networking hardware, network virtualization techniques allow each of the virtual networks 202, 204 to appear to the respective tenants as if they were separate physical networks implemented using separate physical networking components.

The virtual network 202 of Tenant 1 may include a number of networking appliances and end points that are grouped together to provide the functionality required, or desired, by the tenant. As depicted, the virtual network 202 may include a firewall appliance 206 providing a firewall between the external networks 104 and the internal network of the virtual network 202. The virtual appliances may further include a load balancer 208 located behind the firewall appliance 206. The load balancer 208 may receive requests and select one of two web servers 210, 212 for servicing the received request. The load balancer 208 allows processing loads to be transparently split between the multiple web servers 210, 212 that provide the same functionality. The web servers 210, 212 may provide, for example, a web interface to users for one or more applications. The applications may be provided by an application server 216 and communication between the application server 216 and the web servers 210, 212 may pass through a second firewall appliance 214. The application server 216 may provide applications and/or services to the web servers 210, 212. The application server 216 may utilize a database server 218 in order to provide the applications and/or services. The application server 216 and the database server 218 may be implemented one or more of the physical end points 112 depicted in FIG. 1.

As described above, the virtual network 202 groups together common functionality of end points into groups, with each group of end points sharing common traffic flow policies. As depicted, there may be considered 3 different tiers or groups, namely a web tier, provided by web servers 210, 212, an application tier provided by application server 216, and a database tier provided by database server 218. Each of the tiers may be communicatively coupled to each other through one or more networking appliances, such as firewalls, load balancers, and IPSs/IDSs. Although each component in the virtual network is depicted as being connected directly to another component, it will be appreciated that the direct connections are virtual, and the actual physical connections between physical components responsible for providing the implementation of the virtual components may not be direct. Accordingly, while the traffic from the application server 216 to the database server may be provided as a direct virtual connection, the physical connection may require associated data to travel over one or more physical switches and routers.

The virtual network 202 depicts a common 3-tier architecture for a web application. However, it is contemplated that other arrangements of virtual networks are possible based on a tenant's requirements, or desires. As an example, virtual network 204 is depicted as comprising a single firewall appliance 220 between a database server 222 and the external networks 104. It will be appreciated that numerous other arrangements of virtual networks may be provided by connecting groups of end points through one or more network appliance.

Figure 3:
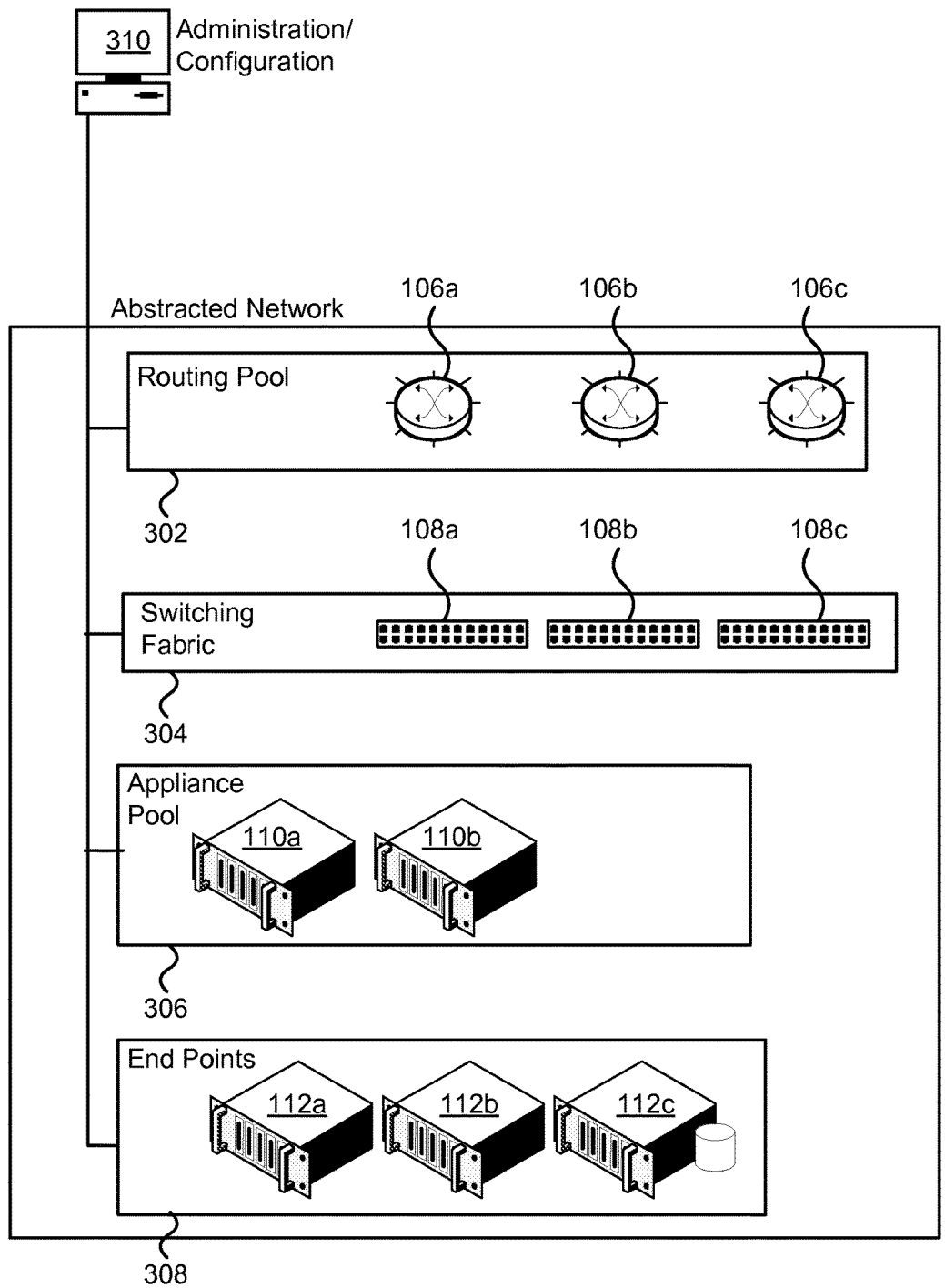
FIG. 3 depicts an abstracted view of physical network components that may be used in administering the physical network components of FIG. 1 to implement the virtual networks depicted in FIG. 2.

FIG. 3 depicts an abstracted view of physical network components that may be used in administering the physical network components of FIG. 1 to implement the virtual networks depicted in FIG. 2. As depicted in FIG. 3, the physical network components may be abstracted as a collection of similar components. In particular, the physical routers 106 may be abstracted as a collective routing pool 302 that can be configured to provide required routing functionality for implementing virtual networks in the physical network. The physical switches 108 may be abstracted as a switching fabric 304. The switching fabric 304 may be configured in order to provide required switching functionality for implementing the virtual networks within the physical network. A number of physical network appliances 110 may be abstracted as an application pool that can be configured to provide networking appliances required by virtual networks. Similarly, the physical end points 112 may be abstracted as an end point pool 308 that can be configured in order to provide the end points required by the virtual networks.

Although depicted as being abstracted as separate appliance pools 306 and end point pools 308, the virtual networking appliances and virtual end points of a virtual network may be implemented on similar types of physical appliances, and as such the appliance pool 306 and end point pool 308 may be provided by a single appliance pool that is capable of being configured in order to provide both the virtual appliances and virtual end points of the virtual networks.

As described, the physical network resources of the networking facility 102 may be abstracted into various pools. Each of the pools may be configured in order to provide required processing and networking functionality using the physical network resources in each pool. As depicted an administration and/or configuration computing device 310 may be used in order to configure the abstracted pools of network resources in order to configure the physical resources to provide one or more virtual networks. While the configuration may be done manually, doing so may require application developers to be aware of actual physical network implementation details, and additionally or alternatively may require infrastructure operators to be aware of application details. The network virtualization technique allows the configuration of the physical networking resources based on a network-centric application described by a service profile to be performed substantially automatically. The service profile allows an application to be defined according to a network-centric view of the application, without requiring specific knowledge of the physical network resources and their configuration capabilities. Mapping the service description to a logical network implementation allows the service description to be used in configuring the physical network components.

Figure 4:
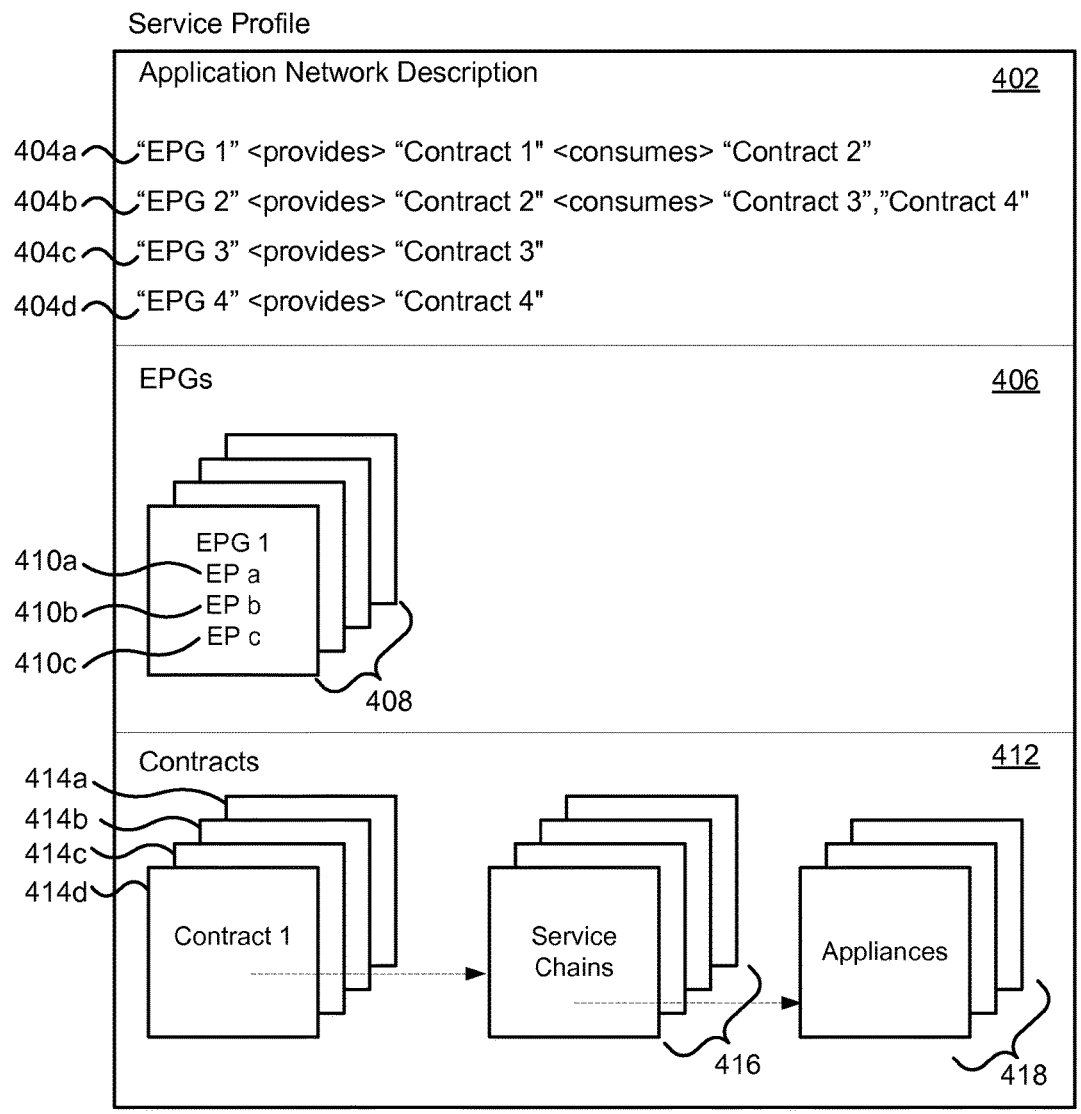
FIG. 4 depicts a representation of a service profile of a network application.

FIG. 4 depicts a representation of a service profile of a network application. The service profile 400 may be based on a group based policy (GBP) model of the application. A group based policy model allows the network resource requirements of an application to be defined independently from the implementation details of the physical network. A tenant's network requirements may be defined as one or more services profiles 400. As described further below, a service profile 400 may be translated into a logical network infrastructure, which in turn can be translated to an implementation in the physical network.

Each service profile 400 defines a tenant's networking requirements, or an independent portion of the tenant's networking requirements. The service profile 400 may comprise a number of end point groups (EPGs) and contracts between the EPGs. As depicted, an application network description 402 may be viewed as specifying a number of EPGs. EPGs 404a, 404b, 404c, 404d (referred to collectively as EPGs 404) and the contracts that each respectively provides and consumes. As depicted in FIG. 4, a first EPG, identified as "EPG 1" provides a contract identified as "Contract 1" and consumes a contract identified as "Contract 2". Similarly, "EPG 2" provides "Contract 2" and consumes "Contract 3" and "Contract 4." "EPG 3" provides "Contract 3" and "EPG 4" provides "Contract 4".

The service profile 400 may further include an EPG definition 406 that defines each of the EPGs 408 included in the application network description 402. Each of the defined EPGs 408 define the end points 410a, 410b, 410c, 410d (referred to collectively as end points 410) within the EPG. Each of the end points may be considered as a Layer 2 or Layer 3 addressable entity. For example, each of the end points 410 may be specified as a network interface card (NIC) identifier, a virtual network interface card (vNIC) identifier, an IP address, or a domain name system (DNS) name identifier.

In addition to the application network description 402 and EPGs 406, the service profile 400 may also include contract definitions 412 describing individual contracts 414a, 414b, 414c, 414d (referred to collectively as contracts 414) specified in the service description 400. The service description 400 may also include one or more service chain definitions 416 that are described in one or more of the contracts 414. As described further below, each service chain may specify a processing order of a traffic flow by one or more appliances. The description of the service chain appliances 418 may be included in the service description 400.

The service profile 400 depicted in FIG. 4 is intended to illustrate individual components, including the EPGs and associated contracts, of a service profile. It will be appreciated that the service profile may be provided in various ways. For example, the individual components may be expressed using a standardized format, or agreed upon format. Further, individual components of a service profile may use existing components. For example, contracts may be reused across multiple service profiles. Further, although the service profile is depicted schematically as a single entity, each of the components may be provided separately.

A contract may comprise a list of policy rules defining traffic constraints between two EPGs, such as access control lists (ACLs) as quality of service (QoS) and possibly other constraints such as required processing by one or more network appliances. Each policy rule includes one or more classifiers and associated action. A classifier includes protocol, ports and direction used in classifying traffic in accordance with the policy rule. Protocols may include for example TCP, UDP, and HTTP etc. Ports may be specified individually, multiply, or in ranges. Direction may be inbound, outbound or bidirectional. An action may include a type and a value, where the action type could be allow, drop, redirect, mirror and log. The associated value may be optional depending upon the associated action type. If the action type is redirect, the value may comprise a service chain ID which refers to a service chain definition.

The following pseudo code listing provides an illustrative contract defining a single policy rule named "XXX" that redirects any inbound TCP traffic received at a port in the range of 9000 to 90002 and redirects the inbound traffic to a service chain having an ID of "99".

```
<Contract>
<PolicyRules>
<PolicyRule>
<name>XXX</name>
    <classifier>
        <protocol>TCP</protocol>
        <ports>9000:9002</ports>
        <direction>IN</direction>
    </classifier>
    <action>
        <type>Redirect</type>
        <value>
            <ServiceChainID>99</ServiceChainID>
        </value>
    </action>
</PolicyRule>
</PolicyRules>
</Contract>
```

The following pseudo code listing provides an illustrative service chain definition that provides the service chain identified in the above illustrated contract. As depicted, the service chain having ID "99" defines an ordered chain of processing by two appliances, namely appliance "aaa" and appliance "bbb"

```
<Service Chain>
<name>YYY</name>
<id> 99 </id>
    <appliance>
        <order>1</order>
        <id>aaa</id>
    </appliance>
    <appliance>
        <order>2</order>
        <id>bbb</id>
    </appliance>
</Service Chain >
```

Each appliance specified in a service chain may be further defined. The following pseudo code listing defines the two appliances, namely "aaa" and "bbb" of the above service chain as being a firewall and a load balancer respectively.

```
<appliance>
    <type>Firewall</type>
    <properties>
        <name>FW1</name>
        <id> aaa </id>
        <shared>false</shared>
    </properties>
</appliance>
<appliance>
    <type>Load Balancer</type>
    <properties>
        <name>LB1</name>
        <id> YYY </id>
    </properties>
</appliance>
```

The appliance types may be defined from a predefined selection that are available at the network facility. For example the appliance type may be one of a firewall, a load balancer, an IPS, and IDS and a NAT appliance. As depicted in the above pseudo code, an appliance may be indicated as a shared appliance. A shared appliance may be created on a shared device, while a non-shared appliance should be created on a dedicated device. The ability to indicate an appliance as shared or not provides tenants with greater control of the implementation of the network. A tenant may desire physical isolation of hardware, and not virtual isolation alone, for certain appliances in order to address particular security concerns.

The above illustrative contract and associated service chain and appliances describes that inbound TCP traffic on ports 9000-9002 are first processed by a firewall named FW1 and then by a load balancer named LB1.

The service profile 400 described above, which may be provided in various formats, may be translated into a logical network implementation comprising logical switches, logical routers, appliances as well as a logical service chain table with quality of service (QoS) policies. The logical switches, logical routers, appliances as well as logical service chain table and quality of service (QoS) policies required for the logical network implementation may be derived from the service profile 400. Once the logical network implementation is generated, it can be mapped to a physical implementation using the available physical resources abstracted by the routing pool, switching fabric, appliance pool, and end point pool. Additionally, or alternatively, the logical network implementation may be used by the tenant for facilitating the operations, administration and management of the virtual network. For example a visual representation of the logical network implementation may be presented to the tenant.

Figure 5:
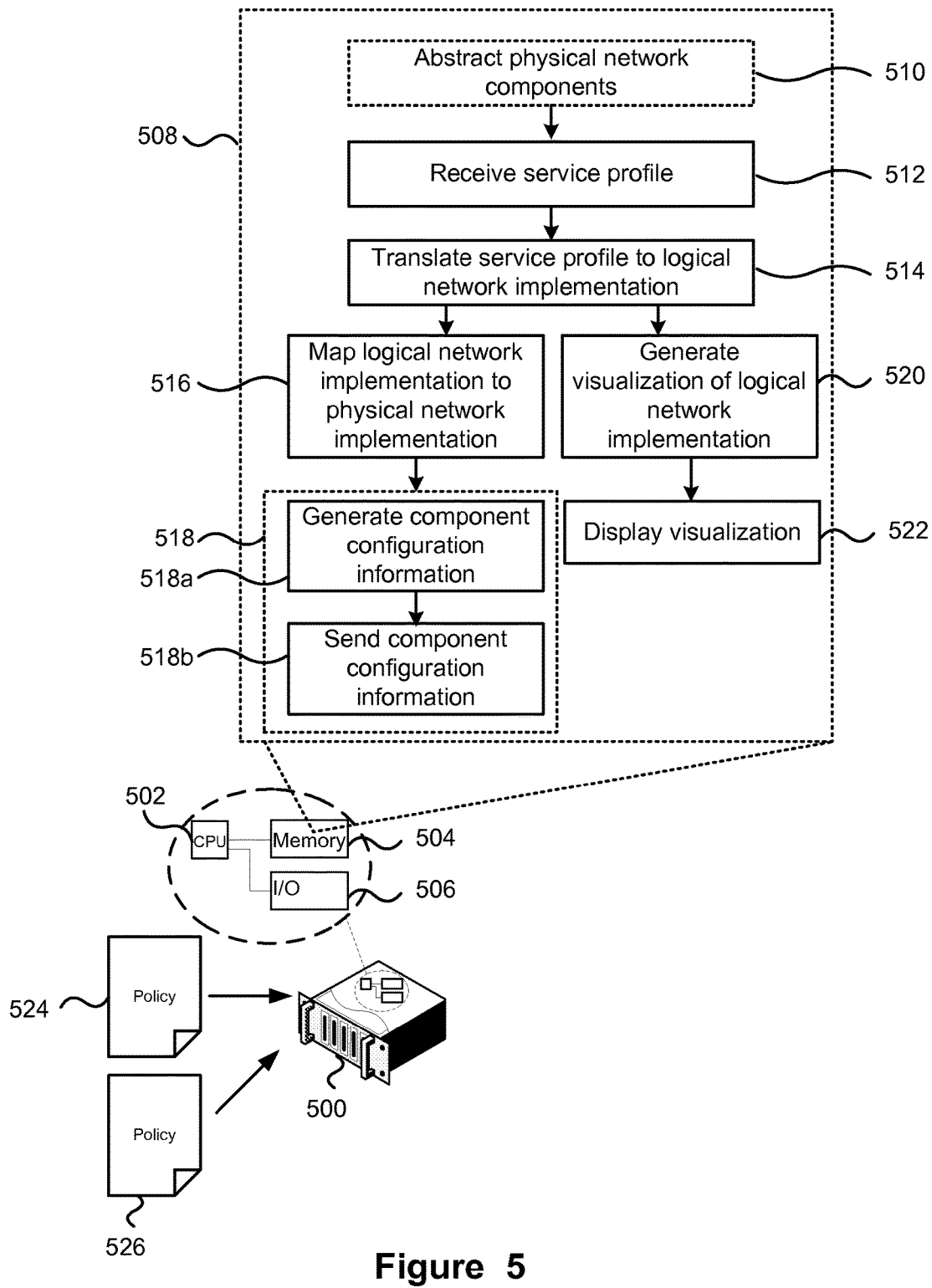
FIG. 5 depicts a computing device for managing network configuration in a multi-tenant network environment.

FIG. 5 depicts a computing device for managing network virtualization in a multi-tenant networking facility. The computing device 500 described below with reference to FIG. 5 may be used as the administration and configuration computing device 310 described above with reference to FIG. 3. As described, above, the administration and configuration computing device 310 may be responsible for provisioning the physical network components, such as those abstracted by the routing pool, switching fabric, appliance pool and end points pool. The computing device 500 may similarly be used to configure available physical networking resources; however, the computing device 500 is configured in order to receive a service profile 524 and configure the physical resources in order to provide the networking resources defined in the service profile 524.

The computing device 500 is depicted as a single physical server comprising a central processing unit 502, memory unit 504 and input/output (I/O) unit 506. The I/O unit 506 may allow one or more networking interfaces to be connected to the computing device 500. It should be apparent that the single physical server 500 depicted may in fact be provided as virtual server. Regardless of whether implemented in a virtual server or physical server, the computing device 500, or rather the processing unit 502 executes instructions and data stored in memory 504 in order to provide functionality 508 for managing network configuration in a multi-tenant network environment.

The functionality 508 is depicted as including functionality for abstracting physical network components (510). The abstraction may group available physical resources into a plurality of pools that the computing device 500 can draw from in order to provide the logical networking requirements translated from a service profile 524. The abstraction may only need to be completed initially for the networking environment in order to group all routing devices into a routing pool, all switches into a switching fabric and all appliances and end points into an appliance pool and an end point pool. Subsequent to the initial abstraction, physical computing resources may be added to, and possibly removed from, the respective pools in order to easily upgrade available computing and networking resources for providing tenants with virtual networks. The abstraction information 526 may be considered as a list of available physical routing, switching and processing capabilities that can be configured using the available networking hardware.

The computing device 500 is configured to receive a service profile (512). The service profile 524 that is received may be received in various ways. For example, a tenant may submit the service profile to the computing device for subsequent provisioning of the network resources. Further, the computing device 500, or other computing device not shown, may provide user interface functionality to allow a tenant to specify the service profile. The user interface may include graphical components, such as dragging and dropping components in a particular arrangement, as well as textual components, such as naming or renaming components. Regardless of how the service profile 524 is received, the computing device 500 is configured translate the service profile into a logical network implementation (514) that corresponds to the networking requirements provided by the service profile 524. The translated logical network infrastructure may comprise one or more logical switches, one or more logical routers, one or more logical appliances as well as a logical service chain table defining traffic flows between appliances and other end points.

Once the computing device 500 generates the logical network implementation, the computing device 500 may be configured to map the logical network implementation to a physical network implementation (516). The mapping from the logical to physical network implementation may utilize the abstracted network information 526 in order to determine available physical networking resources for implementing the logical network implementation translated from the service description. Once the logical network implementation is mapped to the physical network implementation, the computing device 500 may be configured in order to provision the physical networking resources to provide the physical network implementation (518). Provisioning the physical networking resources may include generating component configuration information (518a) and sending the generated component configuration information to the respective network components (518b) in order to configure the components to provide the required, or desired, functionality.

As described above, a service profile defining an application may be translated to a logical network implementation. The logical network implementation may then be mapped to available physical network resources in order to implement the logical network in the physical networking resources. The logical network implementation may also be used for other purposes in addition to, or as an alternative to, mapping to a physical network implementation. As an example, the computing device 500 may be configured to generate a visual representation of the logical network implementation (520) and display the visual representation (522) to a user such as a network or application administrator associated with the tenant.

Figure 6:
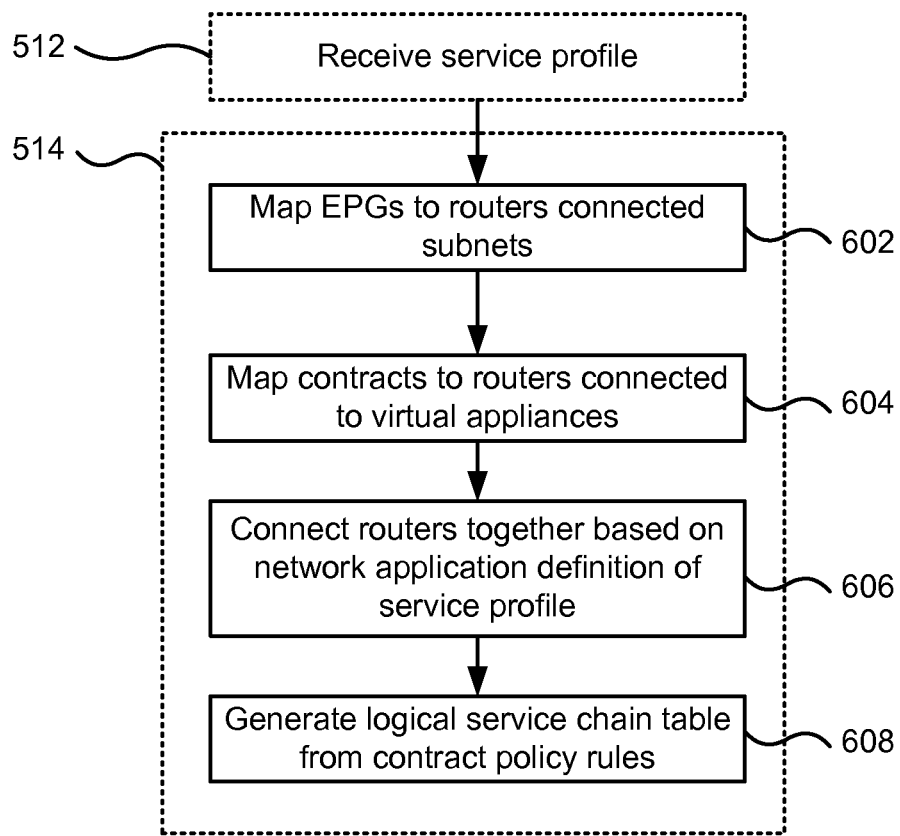
FIG. 6 depicts a method for mapping a service profile to a logical network definition.

FIG. 6 depicts a method for translating a service profile to a logical network definition. As depicted, the method may be used to translate the service profile to the logical network implementation (514) provided by the computing device 500. A service profile is received (512) and translated to a logical network implementation (514). The translation may be performed by mapping each EPG and contract in the received service profile to corresponding logical network components and connecting the logical network components together based on the policy description. Policy rules of contracts defined in the service profile may be mapped to a logical service chain table that comprises multiple flow constraints on traffic flowing between a source, destination and possibly one or more intermediary check points. In the logical network implementation, traffic flows may be steered by policy based routing on the gateways and logical routers and QoS policies may be enforced on forwarding devices as well as checking points. The forwarding devices in the logical network implementation may include logical routers, which may include logical gateways, as well as logical switches. Checking points may be considered as logical network components capable of checking traffic and adjusting the flow and may include, for example routers, gateways, firewalls, NATs, IPSs/IDSs and load balancers.

Translating the service policy to the logical network view comprises mapping each of the EPGs of the service policy to one or more subnets with a sharing gateway (602). The number of subnets an individual EPG may be mapped to may be based on the different subnets that are associated with the individual end points of the group. The one or more subnets mapped from the individual EPG are connected to a common sharing gateway for connecting the one or more subnets together. Each of the subnets may also be associated with a logical switch.

The translation of the service police to the logical network view further comprises mapping the contract to a router connected to zero or more virtual appliances (604). The virtual appliances to be connected to the router may be determined from the appliances specified in any service chains defined in the contract. The routers that were mapped from the contracts are connected in between gateways mapped from EPGs based on the service policy (606). It will be apparent that at least one of the routers will typically be connected between a single EPG gateway and an external network connection. A logical service chain table may be generated from the contract policy rules (608). The logical service chain table provides the flow constraints between the logical network components.

The method described above may be used to translate from a service policy providing a networking resource view of an application, to a logical network implementation. The logical network implementation comprises a plurality of logical switches, routers, appliances and end points connected together. The logical network implementation may further comprise a logical service chain table providing traffic constraints and QoS requirements of traffic flows between connected logical components.

Figure 7:
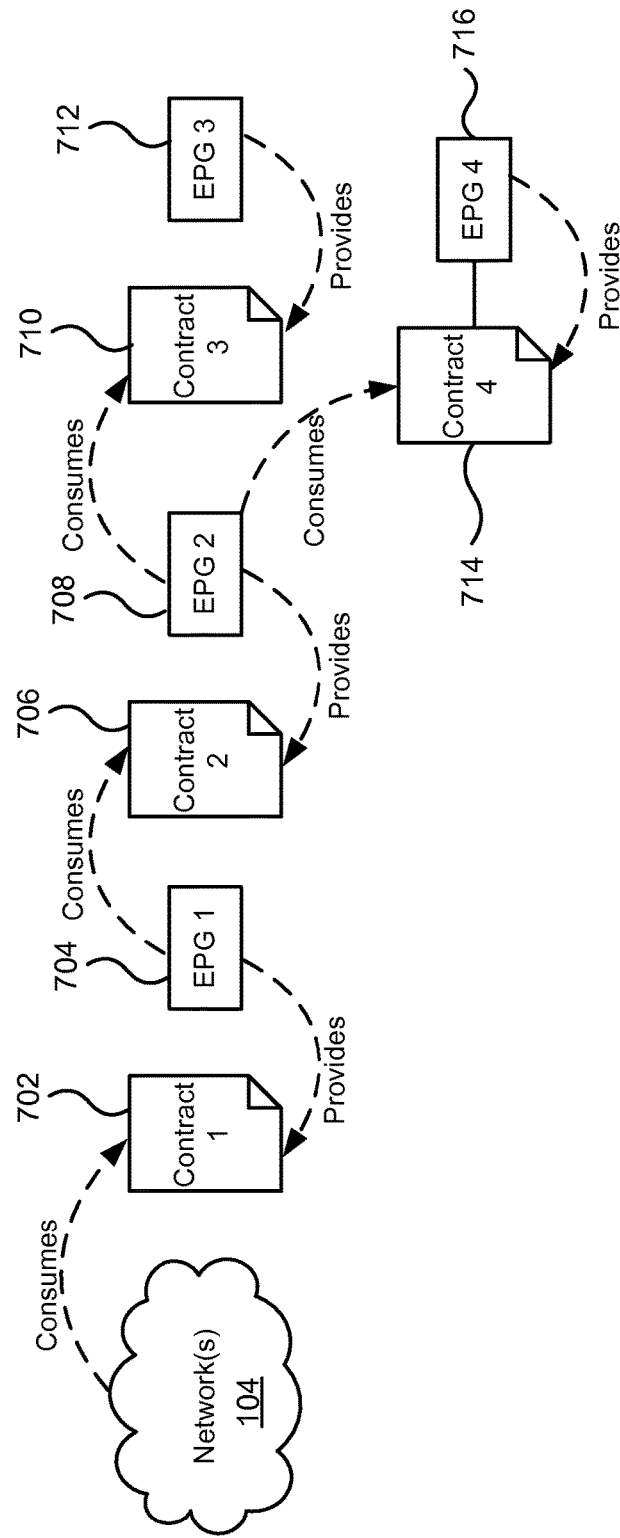
FIGS. 7 to 10 depict schematic representations of the steps of FIG. 6.

FIGS. 7 to 10 depict schematic representations of the steps of FIG. 6. FIG. 7 depicts a schematic representation 700 of the received service profile. As depicted, the received service profile comprises a first contract 702 that defines policies that are enforced on traffic flowing between the external networks 104 and a first EPG 704. A second contract 706 defines policies that are enforced on traffic flowing between the first EPG 704 and a second EPG 708. A third contract 710 defines policies enforced on traffic flowing between the second EPG 708 and a third EPG 712. Finally, a fourth contract 714 defines policies enforced on traffic flowing between the second EPG 708 and a fourth EPG 716.

Figure 8:
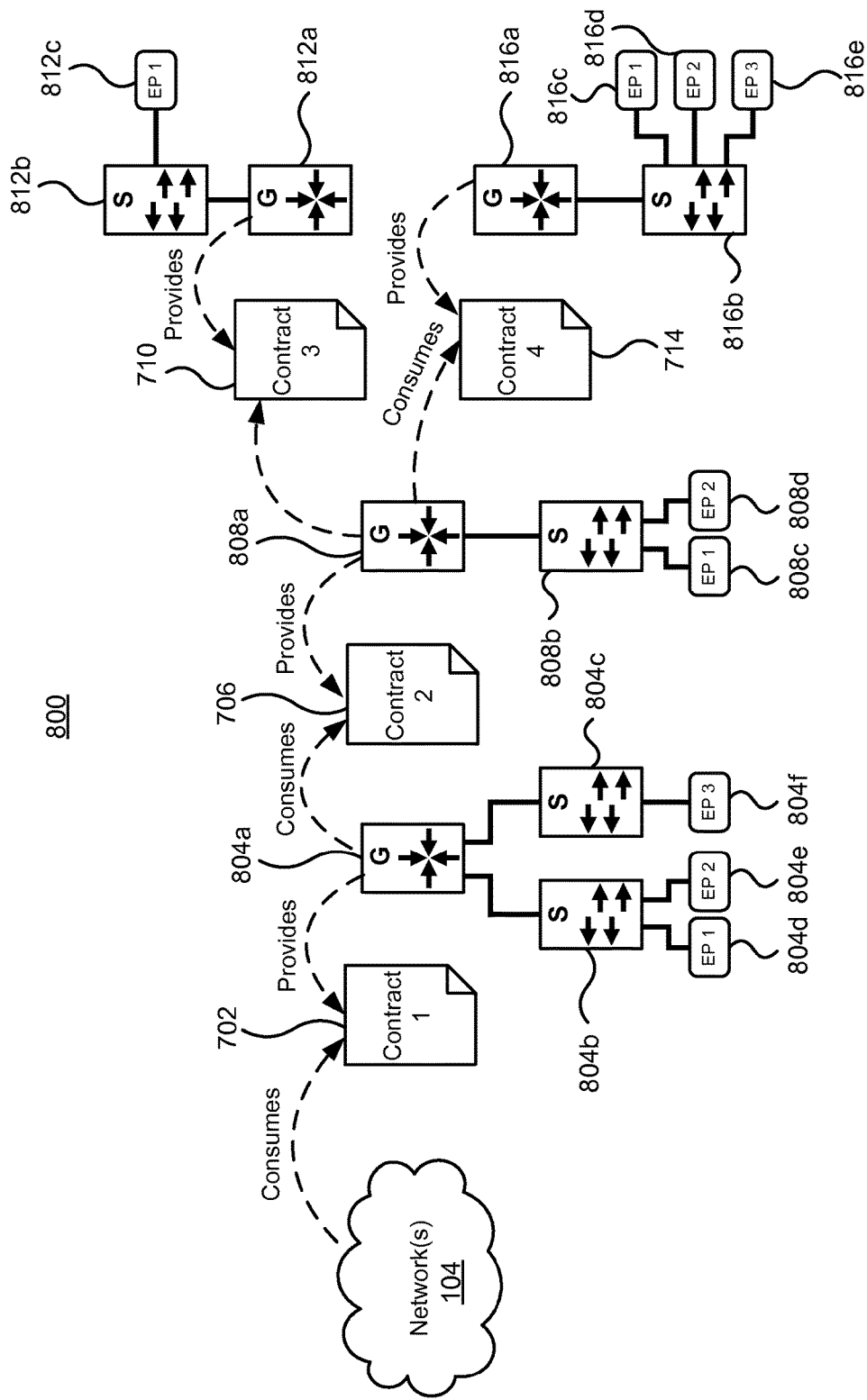

FIG. 8 depicts a schematic representation of the results of mapping the EPGs to corresponding subnets connected to a gateway, with each of the subnets associated with a logical switch. As depicted, the first EPG 704 is mapped to a first gateway 804a connected to two logical switches 804b, 804c associated with the two subnets mapped from the first EPG 704. The logical switches 804b, 804c are each connected to end points in the respective subnets. In particular, logical switch 804b is connected to end points 804d, 804e and logical switch 804c is connected to end point 804f. The second EPG 708 is mapped to a single subnet and logical switch 808b connected to a gateway 808a. The logical switch 808d is connected to the end points of the EPG 708, namely end points 808c, 808d. The third EPG 712 is mapped to a single subnet and logical switch 812b connected to a gateway 812a. A single end point 812c is depicted as being connected to the logical switch 812b. Finally, the fourth EPG is mapped to a single subnet and logical switch 816b connected to a gateway 816a. Three end points 816c, 816d, 816e are depicted as being connected to the logical switch 816b.

Figure 9:
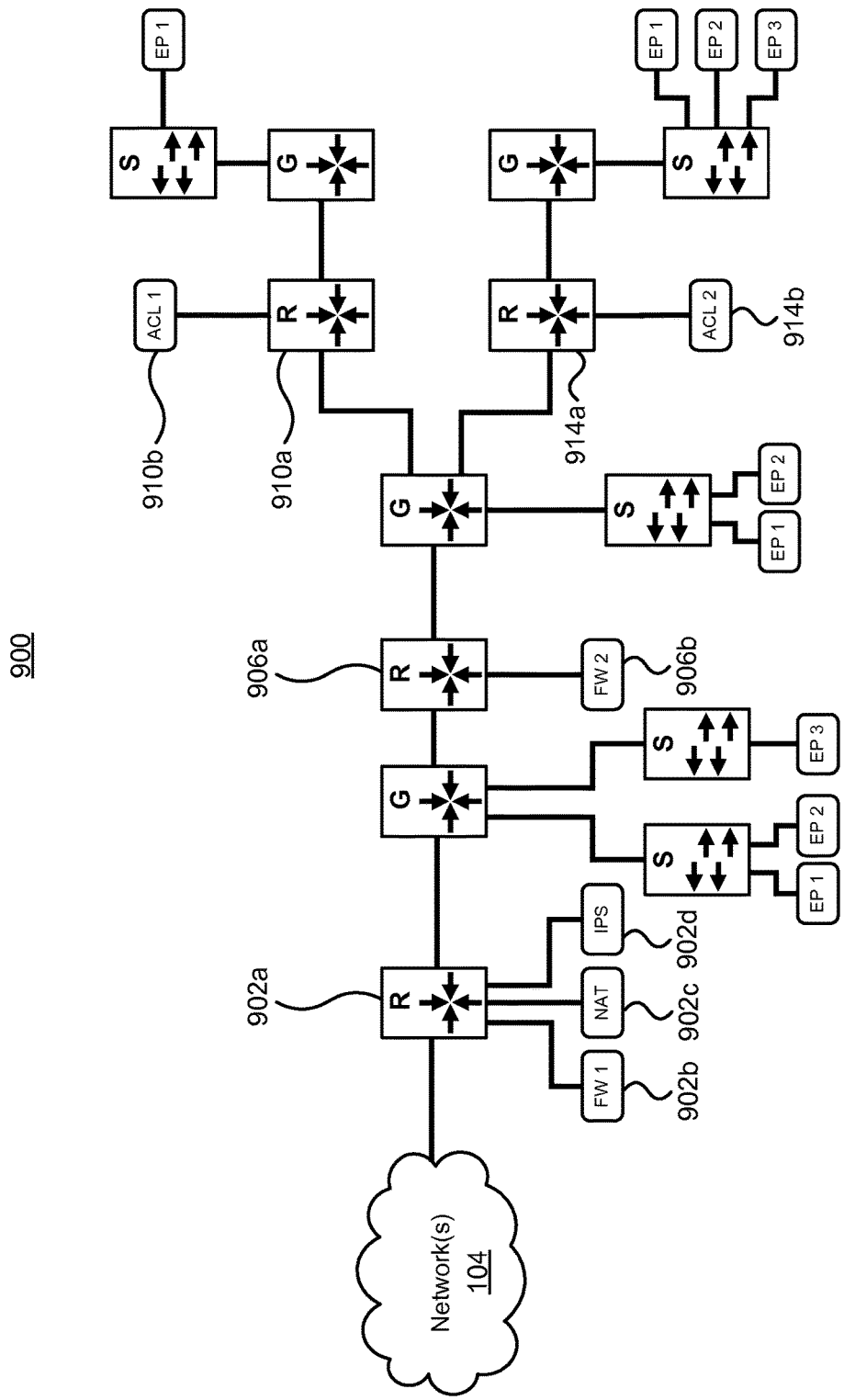

FIG. 9 depicts a schematic representation of the results of mapping contracts to routers and virtual devices and connecting the routers between gateways. In FIG. 9 the logical network components from the EPGs are not numbered again for clarity of the Figure. As depicted, the first contract 702 is mapped to a router that is connected to a number of logical appliances that are specified within service chains of the contract. In particular, the contract 702 is mapped to logical router 902a, which is connected to logical appliances 902b, 902c, 902d. As depicted, logical appliance 902b is a first firewall appliance, logical appliance 902c is a network address translation (NAT) appliance and logical appliance 902d is an intrusion prevention system (IPS) appliance.

The second contract 706 is mapped to a logical router 906a that is connected to logical appliance 906b. The logical appliance 906b is depicted as a second firewall. The third contract 710 and fourth contract 714 are each mapped to respective routers 910a, 914a, however the third and fourth contracts do not specify any appliances in a redirect service chain, and as such are not connected to any virtual appliances. However, the contracts may specify policies that are enforced on traffic flowing between the connected EPG gateways, which may be provided as an ACL and/or QoS that is enforced by the logical routers. Accordingly, as depicted logical router 910a mapped from the third contract 710 may be associated with a first ACL 910b and logical router 914a mapped from the third contract 714 may be associated with a second ACL 914b.

Further, as depicted, each of the logical routers 902a, 906a, 910a, 914a are connected between appropriate EPG gateways. In particular, logical router 902a is connected between the external networks 104 and the first EPG gateway 804a. Logical router 906a is connected between the first EPG gateway 804a and the second EPG gateway 808a. Logical router 910a is connected between the second EPG gateway 808a and the third EPG gateway 812a. Logical router 914a is connected between the second EPG gateway 808a and the fourth EPG gateway 816a.

Figure 10:
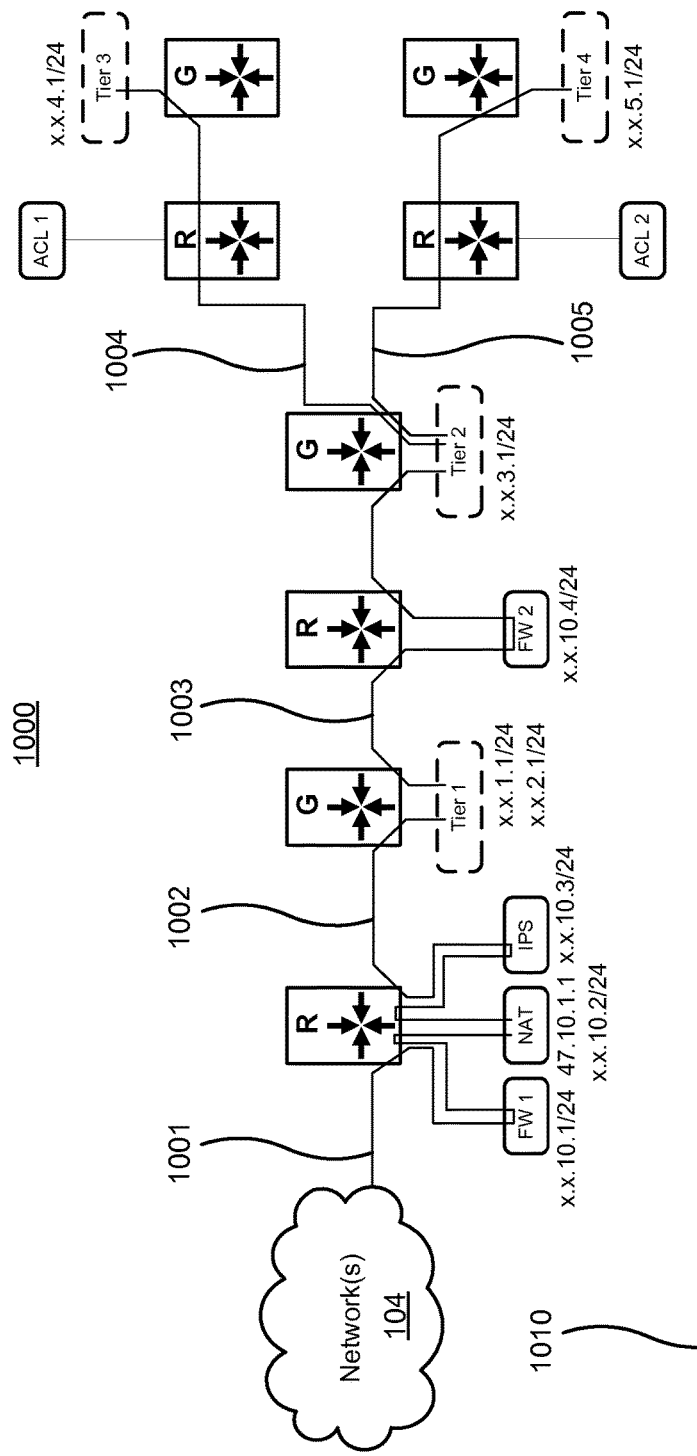

FIG. 10 depicts a schematic representation of the results of generating a logical service chain table. In FIG. 10, the previously mapped logical components from the EPGs and contracts are not labeled again for clarity of the Figure. Further, the logical switches and end points associated with each EPG mapping are represented collectively as a tier within a dashed rectangle. As depicted in FIG. 10, the logical service chain table defines traffic flow between components and may be based on policy rules specified in the individual contracts. The logical service chain table 1010 may be used to specify a processing order between virtual appliances and may be associated with ACL and QoS information, although the ACL information is depicted graphically in associated with respective logical routers 910a, 914a.

The contracts may specify a service chain that provides an ordered chain of processing by virtual appliances. Although the logical connections may be provided by the previous mapping depicted in FIG. 9, the required ordered processing is not provided. The logical service chain table 1010 may be used to specify the order of processing by components required by the contracts. For example, Chain 1 in the table 1010, which corresponds schematically to line 1001, specifies that traffic arriving from the internet passes first to the first firewall applicant and then to the NAT appliance. Chain 2 in the table 1010, represented schematically by line 1002, specifies that traffic should pass from the NAT appliance to the IPS appliance and then onto Tier 1, or rather the subnets and logical switches mapped from EPG 1 . Chain 3, represented by line 1003, specifies that traffic should pass from Tier 1, through the second firewall appliance and to Tier 2, or rather the subnet and logical switch mapped from EPG 2 . Chain 4, represented by line 1004, specifies that traffic should flow from Tier 2, to Tier 3, or rather the subnet and logical switch mapped from EPG 3 . Although depicted in the graphical representation, the ACL information associated with logical router 910a may be included in the logical service chain table in association with Chain 4. Chain 5, represented by line 1005, specifies that traffic should flow from Tier 2, to Tier 5, or rather the subnet and logical switch mapped from EPG 5. Although depicted in the graphical representation, the ACL information associated with logical router 914a may be included in the logical service chain table in association with Chain 5.

Although noted above as being mapped to a gateway or sharing gateway, it is contemplated that the gateway or sharing gateway may be provided by a logical router. Accordingly, the gateway or sharing gateways described above, and in particular with reference to FIGS. 7 to 10, may be replaced with a logical router.

Figure 11:
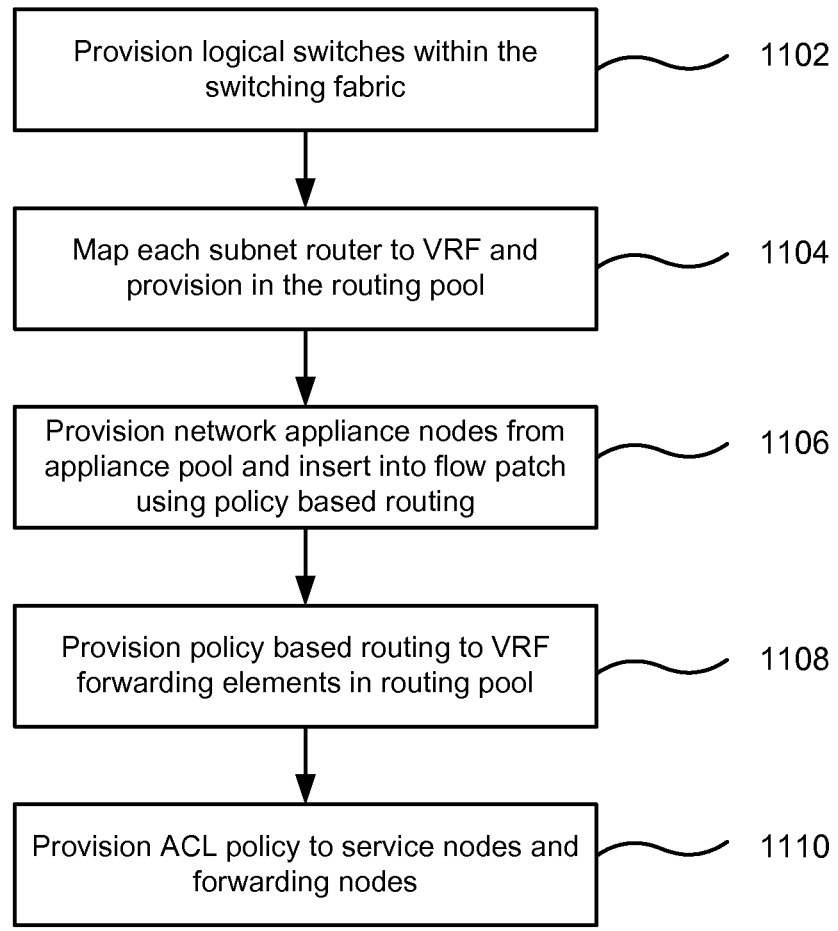
FIG. 11 depicts a method for provisioning a logical network within a physical network.

FIG. 11 depicts a method for provisioning a logical network implementation within a physical network. The method 1100 is performed by a computing device that may provide provisioning functionality allowing tenants in a multi-tenant network facility to configure a network using a GBP model, which may be provided for example by the service description. Once the logical network implementation is translated from a service profile, it can be provisioned within the physical network by automatically mapping the logical network implementation to a physical implementation. The method 1100 for provisioning the logical network implementation uses the abstracted network resources in order to have a pool of resources capable of implementing the logical network. The selection of actual physical components for implementing components of the logical network may be selected from the respective pools using various techniques in order to optimize the selection. As an example, although a direct connection in the logical network may be implemented using a virtualized connection crossing over multiple physical routers and switches, it may be desirable to select components such that the amount or physical components required to implement the logical network in the physical world is minimized. Other optimization, or at least consideration, factors may be applied to the selection of physical components from the available pools.

The method 1100 comprises provisioning the logical switches within the switching fabric (1102). This may be achieved by configuring selected physical switches within the switching fabric using VLANs and/or VXLANs to provide the logical switches. The method 1100 maps each router and/or gateway if present to a VRF and provision the VRF within the routing pool (1104). Network appliance nodes are provisioned from the appliance pool and policy based routing is determined for inserting the provisioned appliance nodes within the appropriate flow path (1106). The policy based routing is provisioned to VRF forwarding elements within the routing pool (1108). The ACL policy may then be provisioned to application nodes and forwarding nodes (1110).

As described above it is possible to use network virtualization techniques in order to provision physical network components based on a service profile. The service profile may be a GBP based service description. The technique does not require any specialized hardware or networking components and as such provides for the network virtualization using legacy network devices, which may reduce operating expenses and capital expenses associated with a data center, or multi-tenant network facility. A logical network infrastructure layer is inserted between the service description and network abstraction/physical layer. The logical network layer allows the service description to be mapped to the logical layer, which may then be mapped to the physical layer.

Although certain components and step have been described, it is contemplated that individually described components, as well as steps, may be combined together into fewer components or steps or the steps may be performed sequentially, non-sequentially or concurrently. Similarly, individual components or steps may be provided by a plurality of components or steps. One of ordinary skill in the art having regard to the current teachings will appreciate that the network virtualization may be provided by various combinations of software, firmware and/or hardware, other than the specific implementations described herein as illustrative examples.

The network virtualization techniques described above may be implemented by using suitable software, hardware, firmware and/or combinations thereof. The network virtualization techniques described above may be provided as instructions stored in or on a computer readable media for execution by a processor. The executed instructions may configure a computing device to provide the network virtualization techniques described above. The instructions may be stored in a nonvolatile or non-transitory storage medium, which can be a compact disk read-only memory (CD-ROM), USB flash disk, or a removable hard disk or other types of nonvolatile memory.

Although various specific embodiments have been described in detail, it will be apparent to one of ordinary skill in the art that various changes, substitutions and alterations may be made to the specific embodiments described herein without departing from the teachings of the description. The specification and drawings are, accordingly, to be regarded as an illustration of the subject matter recited by the appended claims, and are contemplated to cover any and all modifications, variations, combinations or equivalents that fall within the scope of the teachings of the description and drawings as a whole.

What is claimed is:

1. A method for network configuration in a multi-tenant network environment executed by a processor, the method comprising:
   receiving a service profile defining network application requirements for a tenant of the network environment, the service profile comprising at least two end point groups (EPGs) and at least one policy contract defining traffic flow constraints between the at least two EPGs, the service profile being based on a group based policy (GBP) model of a network application, the GBP defining network resource requirements of the network application independently from physical network implementation details;
   mapping the received service profile to an intermediate logical network implementation associating a plurality of logical routers, logical switches and logical appliances, the plurality of logical routers, logical switches and logical appliances and associations therebetween being defined based on the service profile and satisfying the network application requirements;
   mapping the logical network implementation to a physical network implementation on available network hardware in the network environment;
   generating component configuration information to configure the available network hardware to provide the physical network implementation of the service profile defining the network application requirements; and
   sending the generated component configuration information to the available network hardware for implementing the physical network implementation.

2. The method of claim 1, further comprising:
   configuring the available network hardware according to the generated component configuration information.

3. The method of claim 1, wherein mapping the received service profile to the logical network implementation comprises:
   mapping each EPG to at least one logical subnet associated with a logical EPG router; and
   mapping each policy contract to one or more virtual appliances connected to a logical contract router.

4. The method of claim 3, wherein mapping the received service profile to the logical network implementation further comprises:
   connecting logical EPG routers with logical contract routers based on the at least one policy contract; and
   generating a logical service chain table comprising multiple chain entries each defining traffic flow constraints for the respective chain between logical network components.

5. The method of claim 4, wherein each of the logical contract routers is coupled to at least one of the at least one logical EPG router and each of the at least one logical subnet is associated with a logical switch.

6. The method of claim 1, wherein each of the at least one EPGs define at least one end point sharing common traffic flow policy requirements.

7. The method of claim 1, wherein each of the at least one policy contract comprises one or more policy rules defining traffic flow constraints between one or more EPGs.

8. The method of claim 7, wherein at least one of the one or more policy rules specifies a service chain for processing a traffic flow, the service chain defining an ordered processing of one or more network appliances.

9. The method of claim 8, wherein the one or more network appliances are selected from:
   a firewall;
   a load balancer;
   a network address translation (NAT) device;
   an intrusion detection system (IDS); and
   an intrusion prevention system (IPS).

10. The method of claim 1, wherein mapping the logical network implementation to the physical network implementation uses network abstraction information specifying physical network components of a switching fabric, a routing pool and an appliance pool.

11. The method of claim 1, further comprising:
generating a visual representation of the logical network implementation for the tenant.

12. A computing device providing network configuration in a multi-tenant network environment comprising:
a network interface for communicating with computing devices in the multi-tenant network environment;
a memory for storing instructions; and
a processor for executing the instructions, which when executed cause the processor to configure the computing device to:
receive a service profile defining network application requirements for a tenant of the network environment, the service profile comprising at least two end point groups (EPGs) and at least one policy contract defining traffic flow constraints between the at least two EPGs, the service profile being based on a group based policy (GBP) model of a network application, the GBP defining network resource requirements of the network application independently from physical network implementation details;
map the received service profile to an intermediate logical network implementation associating a plurality of logical routers, logical switches and logical appliances, the plurality of logical routers, logical switches and logical appliances and associations therebetween being defined based on the service profile and satisfying the network application requirements;
map the logical network implementation to a physical network implementation on available network hardware in the network environment;
generate component configuration information to configure the available network hardware to provide the physical network implementation of the service profile defining the network application requirements; and
send the generated component configuration information to the available network hardware for implementing the physical network implementation.

13. The computing device of claim 12, wherein the executed instruction cause the processor to configure the computing device to further:
configure the available network hardware according to the generated component configuration information.

14. The computing device of claim 12, wherein mapping the received service profile to the logical network implementation comprises:

mapping each EPG to at least one logical subnet associated with a logical EPG router; and
mapping each policy contract to one or more virtual appliances connected to a logical contract router.

15. The computing device of claim 14, wherein mapping the received service profile to the logical network implementation further comprises::
connecting logical EPG routers with logical contract routers based on the at least one policy contract; and
generating a logical service chain table comprising multiple chain entries each defining traffic flow constraints for the respective chain between logical network components.

16. The computing device of claim 15, wherein each of the logical contract routers is coupled to at least one of the at least one logical EPG router and each of the at least one logical subnet is associated with a logical switch.

17. The computing device of claim 12, wherein each of the at least one EPGs define at least one end point sharing common traffic flow policy requirements.

18. The computing device of claim 12, wherein each of the at least one policy contract comprises one or more policy rules defining traffic flow constraints between one or more EPGs.

19. The computing device of claim 18, wherein at least one of the one or more policy rules specifies a service chain for processing a traffic flow, the service chain defining an ordered processing of one or more network appliances.

20. The computing device of claim 19, wherein the one or more network appliances are selected from:
a firewall;
a load balancer;
a network address translation (NAT) device;
an intrusion detection system (IDS); and
an intrusion prevention system (IPS).

21. The computing device of claim 12, wherein mapping the logical network implementation to the physical network implementation uses network abstraction information specifying physical network components of a switching fabric, a routing pool and an appliance pool.

22. The computing device of claim 12, wherein the executed instruction cause the processor to configure the computing device to further:
generate a visual representation of the logical network implementation for the tenant.

* * * * *